United States Patent
Bradshaw et al.

(10) Patent No.: US 6,695,188 B1
(45) Date of Patent: Feb. 24, 2004

(54) BODY MOUNTED MONO-POD CAMERA SUPPORT ASSEMBLY

(76) Inventors: David Jerome Bradshaw, 625 Hillbrook, Quincy, IL (US) 62305; Donivan Jerome Bradshaw, 3006 Kelly Ct., Aurora, IL (US) 60504

( * ) Notice: Subject to any disclaimer, the term of this patent is extended or adjusted under 35 U.S.C. 154(b) by 0 days.

(21) Appl. No.: 10/342,065

(22) Filed: Jan. 14, 2003

(51) Int. Cl.[7] .............................................. G03B 17/00
(52) U.S. Cl. ...................... 224/625; 224/245; 224/251; 224/576; 224/650; 224/652; 224/653; 224/908; 396/421; 396/423
(58) Field of Search .................. 224/245, 251, 224/576, 607, 625, 650, 652, 653, 677, 679, 908, 915; 396/421, 422, 423, 428; 248/176.3, 186.2

(56) References Cited

U.S. PATENT DOCUMENTS

| | | | | |
|---|---|---|---|---|
| 2,771,826 A | * | 11/1956 | Shapiro | 224/908 |
| 4,327,986 A | * | 5/1982 | Carter | 396/423 |
| 4,561,576 A | * | 12/1985 | Lowe et al. | 224/652 |
| 4,687,309 A | * | 8/1987 | Breslau | 396/423 |
| 5,024,360 A | | 6/1991 | Rodriguez | 224/215 |
| 5,205,448 A | * | 4/1993 | Kester et al. | 224/908 |
| 5,240,106 A | | 8/1993 | Plath | 206/316.2 |
| 5,323,942 A | | 6/1994 | Danan | 224/215 |
| 5,462,214 A | | 10/1995 | Buswell | 224/224 |
| D378,163 S | | 2/1997 | Clissold | D3/218 |
| 5,603,441 A | * | 2/1997 | Easter | 224/652 |
| 5,630,536 A | | 5/1997 | Bagnaski | 224/600 |
| D382,286 S | * | 8/1997 | Doran | 224/908 |
| 5,687,896 A | * | 11/1997 | Clift | 224/625 |
| 6,308,722 B1 | * | 10/2001 | Christie | 224/576 |
| 6,336,576 B1 | * | 1/2002 | Easter | 224/652 |

* cited by examiner

Primary Examiner—Gary E. Elkins
(74) Attorney, Agent, or Firm—Head Johnson and Kachigian

(57) ABSTRACT

An apparatus for supporting a camera in a stable position from an individual's torso comprising, a storage compartment which is defined by upper and lower walls, opposite side walls and front and rear walls, the rear wall further comprising a proximal attachment surface and a distal attachment surface; a waist band with first and second locking elements attached to the proximal attachment surface of the rear wall, a neck band attached to the proximal attachment surface of the rear wall, a mono-pod receptacle with a mono-pod receiving bore, and at least one adjustable attachment means for fixedly positioning a mono-pod insertably received within the receiving bore.

8 Claims, 3 Drawing Sheets

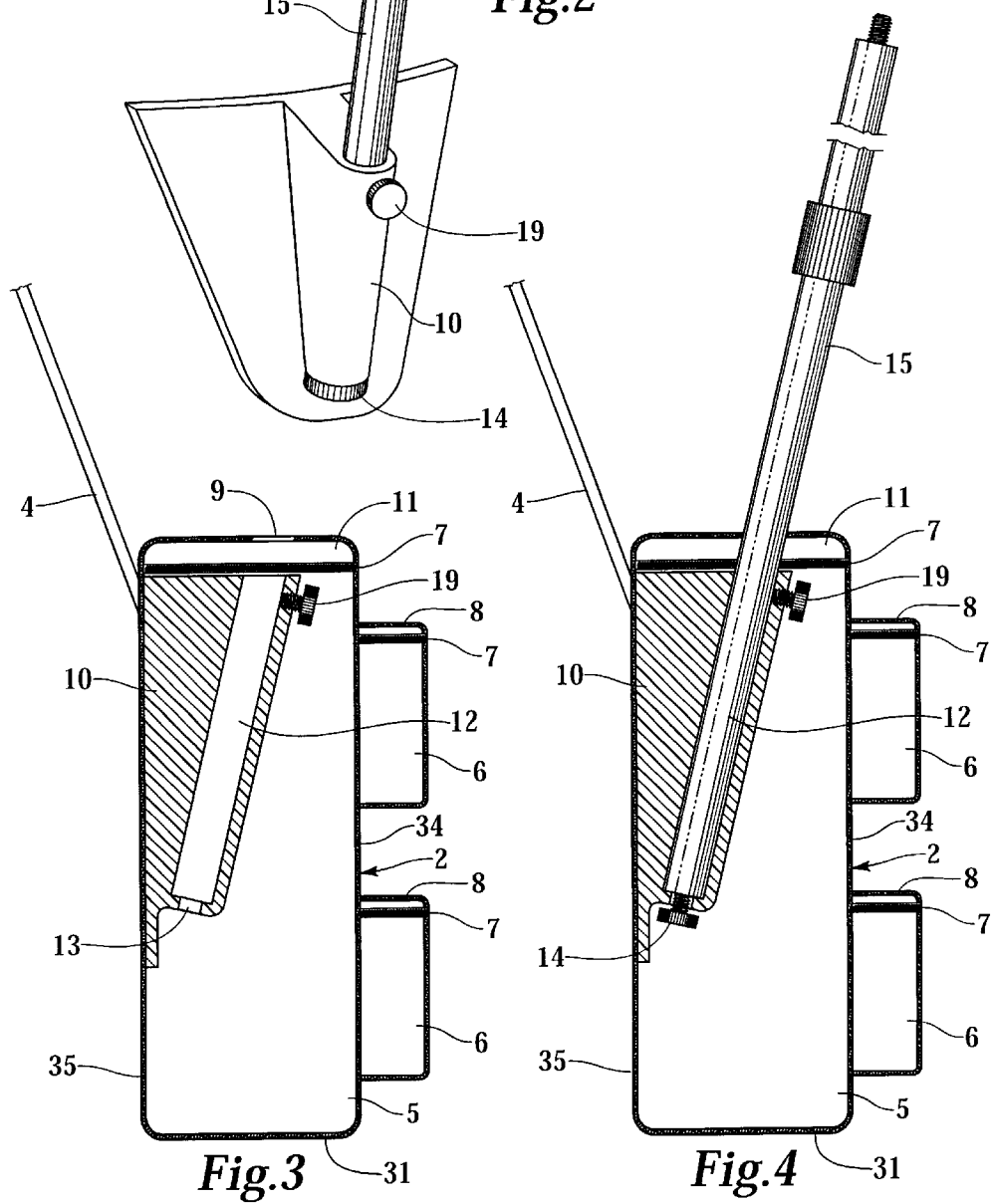

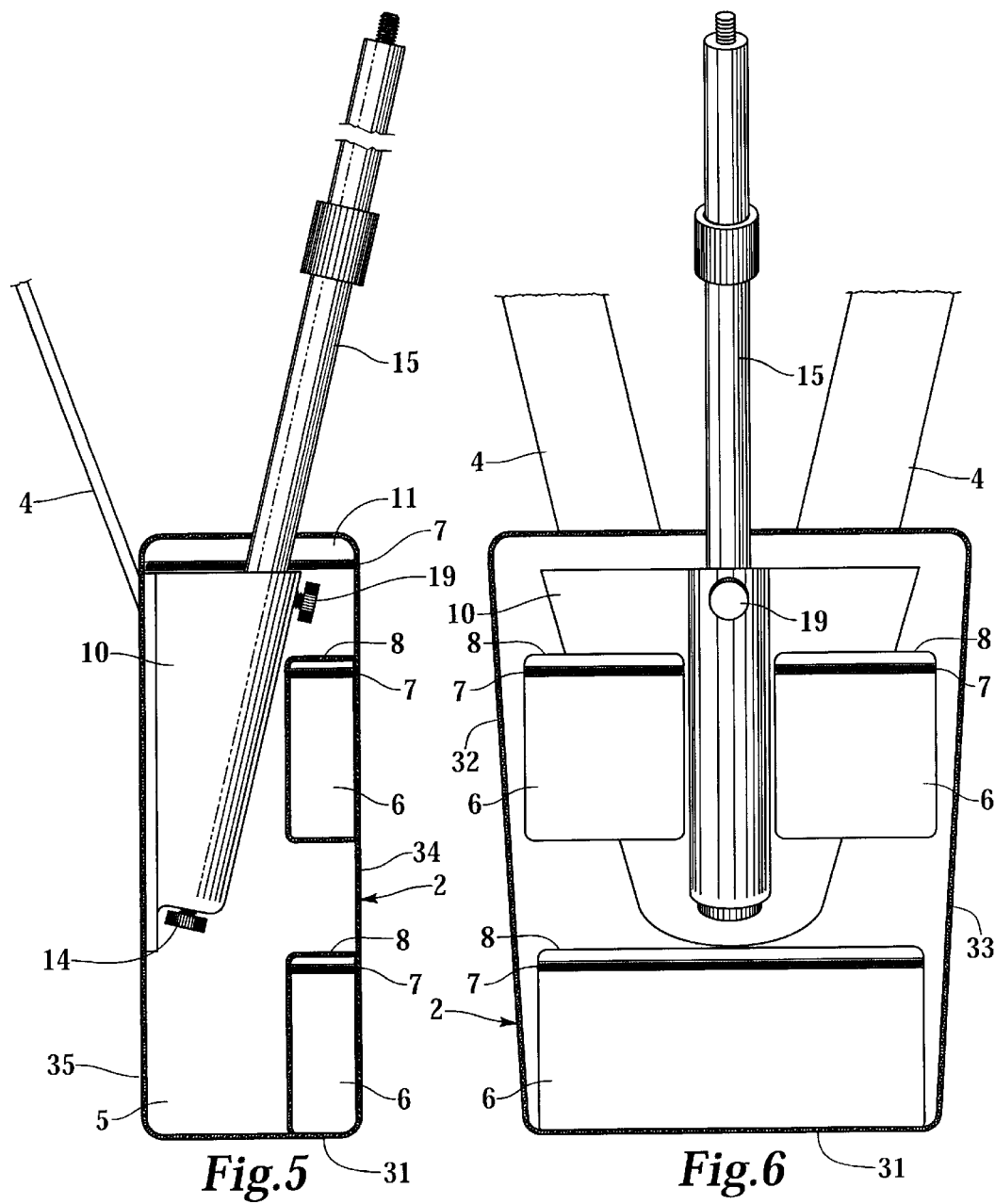

BODY MOUNTED MONO-POD CAMERA SUPPORT ASSEMBLY

REFERENCE TO PENDING APPLICATIONS

This application is not related to any pending applications.

REFERENCE TO MICROFICHE APPENDIX

This application is not referenced in any microfiche appendix.

TECHNICAL FIELD OF THE INVENTION

The present invention relates generally to devices to stabilize camera positioning and in particular, to a body mounted camera support assembly embodying a mono-pod receptacle with an integrated bore for insertably receiving a mono-pod.

BACKGROUND OF THE INVENTION

Numerous and varied attempts to provide a stabilized photography platform which can worn about a human torso have been attempted in the past.

U.S. Pat. No. 5,462,214 (the '214 patent) issued on Oct. 31, 1995 to Brian Buswell purports to disclose and claim a body mounted camera support assembly to be used in conjunction with a tripod. The disclosure and claims of the '214 patent clearly articulate intent and teaching relating to stands having at least two adjustable legs requiring locking elements to be mounted to the lower end of said legs. As such, the '214 patent fails to address the art enhancement teachings of the instant invention where user preference for a mono-pod camera mount may be accommodated via a receiving aperture and adjustment means for receiving, positioning and securing the mono-pod in a desired position.

The '214 patent further discusses other camera mounting assemblies and camera support assemblies part and disclosed in association with its history of the related art. Said patents are herein offered for purposes of full and enabling disclosure with each of said following patents incorporated by reference herein in its entirety: U.S. Pat. No. 817,207 to Wheeler; U.S. Pat. No. 2,771,826 to Shapiro; U.S. Pat. No. 2,952,200 to Welch; U.S. Pat. No. 3,826,513 to Wolf; U.S. Pat. No. 4,158,490 to Gottschalk; U.S. Pat. No. 4,327,986 to Carter; U.S. Pat. No. 4,348,034 to Welt; U.S. Pat. No. 4,687,309 to Breslau and U.S. Pat. No. 4,826,187 to Abbott.

SUMMARY OF THE INVENTION

An apparatus for supporting a camera in a stable position from an individual's torso comprising, a storage compartment which is defined by upper and lower walls, opposite side walls and front and rear walls, the rear wall further comprising a proximal attachment surface and a distal attachment surface; a waist band with first and second locking elements attached to the proximal attachment surface of the rear wall, a neck band attached to the proximal attachment surface of the rear wall, a mono-pod receptacle with a mono-pod receiving bore, and at least one adjustable attachment means for fixedly positioning a mono-pod insertably received within the receiving bore.

It is an object of the instant invention to teach and disclose a camcorder/camera body pack that can be worn in front of a human torso and that further integrates and fixedly positions a mono-pod.

A further object of the instant invention is to eliminate the strain of holding a camera for an undetermined period of time and prevent the arms from falling asleep.

Yet another object of the instant invention is to allow a photographer to film for a longer period of time than is presently realized via art of contemporary design.

Another object of the instant invention is to enable a photographer to have access to accessories, such as film, lens, etc. via one or more storage areas which are embodied within a pack storage compartment of the apparatus.

A further object of the instant invention is to allow a photographer to move from position to position without stowing a camera, or having to carry separate camera bags and/or tripod.

Another object of the instant invention is to facilitate and enhance the speed in which the photographer may cover a photographically significant event.

An additional object of the instant invention is to eliminate the photographer's locating of an appropriate surface area to set up and position a tripod.

A further object of the instant invention is to reduce physical strain of the photographer by removing weight from the photographer's arms and transferring weight to the trunk of a body.

Another object of the instant invention is to protect a camera and accessories from adverse weather conditions via storage of said camera and accessories in the invention's storage area.

Yet another object of the instant invention is to enable all persons to hold a camera more steadily irrespective of experience.

A further object of the instant invention is to allow motion shots to appear smoother via the stable operating platform provided by the instant invention.

A further object of the instant invention is to render unlikely the theft of a camera/camcorder once attached to the mono-pod of the instant invention.

It is to be understood that both the foregoing general description and the following detailed description are exemplary and explanatory only, and are not restrictive of the invention as claimed. The accompanying drawings, which are incorporated herein by reference, and which constitute a part of this specification, illustrate certain embodiments of the invention and, together with the detailed description, serve to explain the principles of the present invention.

In this respect, before explaining at least one embodiment of the invention in detail, it is to be understood that the invention is not limited in this application to the details of construction and to the arrangement so the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore that the claims be regarded as including such equivalent constructions insofar as they do not depart from the spirit and scope of the present invention.

Further, the purpose of the foregoing abstract is to enable the U.S. Patent and Trademark Office and the public generally, and especially the design engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Additional objects and advantages of the invention are set forth, in part, in the description which follows and, in part, will be apparent to one of ordinary skill in the art from the description and/or from the practice of the invention.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference would be had to the accompanying drawings, depictions and descriptive matter in which there is illustrated preferred embodiments and results of the invention.

DESCRIPTION OF THE DRAWINGS

FIG. 2 illustrates an isolated view of the mon-pod receptacle of the instant invention.

FIG. 3 illustrates an embodiment of the invention providing further detail with respect to the invention's mono-pod receptacle and its receiving bore.

FIG. 4 illustrates an embodiment of the instant invention providing further detail with respect to the illustration of FIG. 2 and shows a mono-pod inserted in the invention's central bore and secured from rotational or vertical displacement via a securing means.

FIG. 5 illustrates a readily envisioned alternative embodiment of the instant invention wherein storage compartments of the instant invention are located within an internal portion of the invention.

FIG. 6 is a frontal view of the alternative embodiment as illustrated in FIG. 5.

DESCRIPTION OF THE PREFERRED EMBODIMENT

Figure 1:
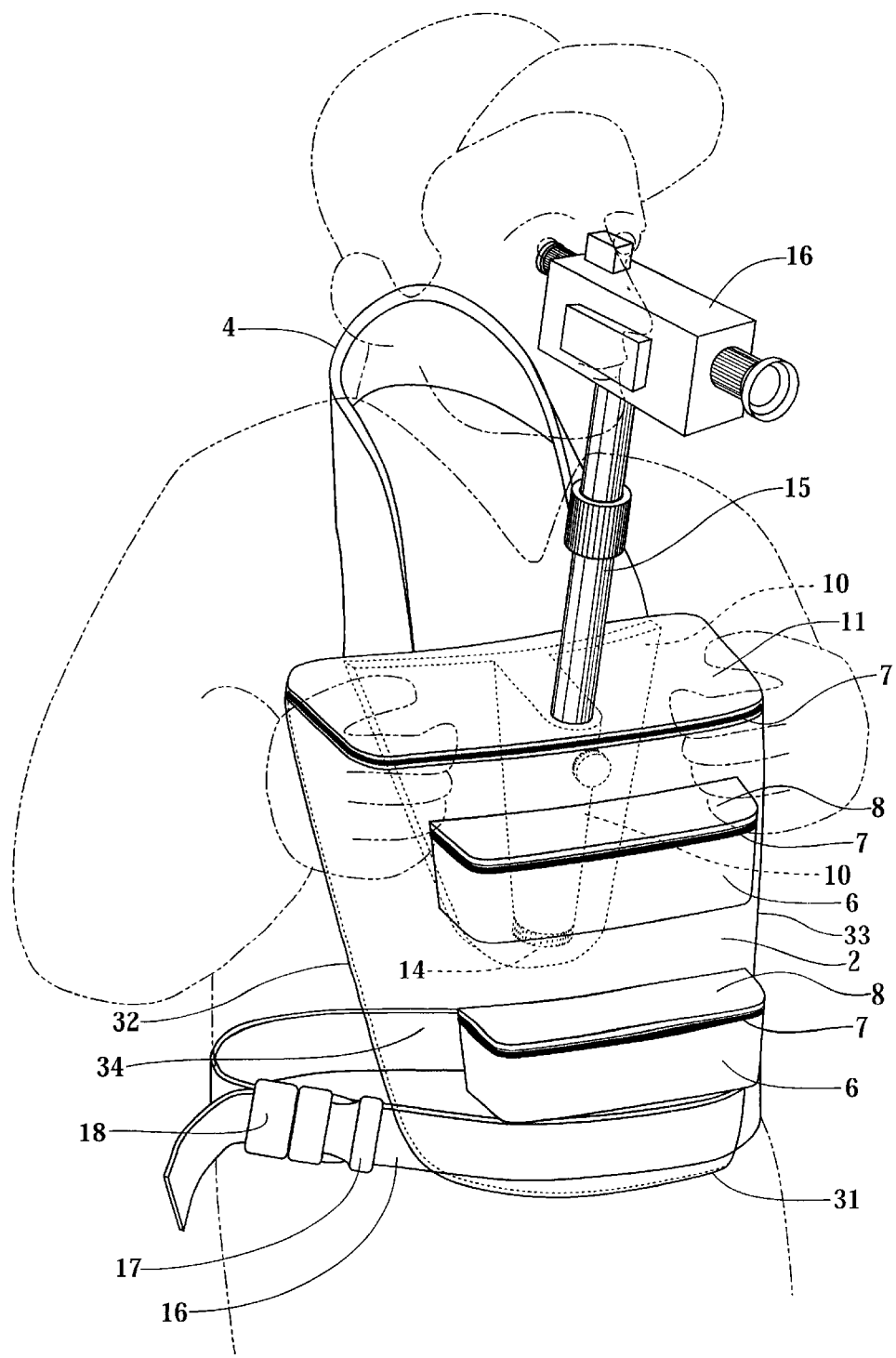
FIG. 1 illustrates one embodiment of the instant invention as positioned about a human torso via waist and neck strap attachment means and further illustrates in dashed lines a mono-pod receptacle.

While the making and using of various embodiments of the present invention are discussed in detail below, it should be appreciated that the present invention provides for inventive concepts capable of being embodied in a variety of specific contexts. The specific embodiments discussed herein are merely illustrative of specific manners in which to make and use the invention and are not to be interpreted as limiting the scope of the instant invention.

FIG. 1 illustrates one embodiment of the instant invention as positioned about a human torso via waist and neck strap connections and further illustrates in dashed lines a mono-pod receptacle. Turning now to FIG. 1.

In FIG. 1 the apparatus for supporting a camera in a stable position from an individual's torso is generally shown as 2 and is illustrated as comprising a storage compartment which is defined by upper and lower walls 11, 31, opposite side walls 32, 33 and front and rear walls 34, 35 (rear wall not illustrated clearly in FIG. 1, further referenced and discussed in detail and association with FIGS. 3, 4 and 5). A waist band 16 is utilized to attach the apparatus about a human torso with said waist band 16 attached to the proximal surface of the apparatus rear wall 35 and is interlocked by opposite ends via first and interlocking elements 17 and 18. As will be readily apparent to one skilled in the art, such locking means (17, 18) may be of the snapping type as illustrated or a hook stitch combination, such as is readily represented by a trademark Velcro® means. A mono-pod receptacle 10 is connected to the distal surface of the rear wall via stitching or other permanently bonding means. Said mono-pod receptacle 10 as practiced in one embodiment of the instant invention is embodied as a unitary structure of molded plastic, such as but not limited to those realized via any injection molding process. A neck band 4 further attaches the apparatus 2 around the neck portion of a human being. Opposite ends of said neck band 4 are stitchably or otherwise permanently attached to the proximal surface of said rear wall 35. A mono-pod 15 is shown inserted through an aperture in the upper wall 11 allowing for its insertion into a receiving bore integrated within the mono-pod receptacle 10 (said aperture not illustrated in FIG. 1, further disclosed and discussed with additional specificity in association with FIGS. 3, 4 and 5).

FIG. 2 illustrates an isolated view of the mon-pod receptacle of the instant invention. Turning now to FIG. 2.

In FIG. 2 mono-pod 15 is shown inserted into mono-pod receptacle 10 and is secured to the receptacle at an end 14 opposite that of camera 16. Connection of adjustably attached mono-pod 15 to the bottom of mono-pod receptacle 10 is shown as a screwing type connection means wherein screw 14 traverses the bottom of the receptacle 10 to allow connection thereto of mono-pod 15. Further discussion of means to attach said mono-pod 15 to mono-pod receptacle 10 to avoid vertical movement of mono-pod 15 discussed and disclosed further in association with FIGS. 3, 4 and 5.

FIG. 3 is a side view illustration of the instant invention providing further detail with respect to the invention's mono-pod receptacle and its receiving bore. Turning now to FIG. 3.

In FIG. 3 the mono-pod receiving bore 12 is shown with distinguishable clarity and further illustrates adjustment means 19 which non-limitedly illustrates a screw-type or lever-type adjustment means to introduce adjustable pressure to a mono-pod (not illustrated) and preclude said mono-pod's rotational movement when inserted within said receiving bore 12. FIG. 3 further illustrates an aperture 13 in the bottom of mono-pod receptacle 10 to allow traversing thereof. Screwable adjustment means 14 (not shown in FIG. 3) traverses said aperture 13 and screws into or otherwise attached to mono-pod when inserted in said receiving bore 12 to preclude the mono-pod's vertical movement.

FIG. 4 provides further detail with respect to the illustration of FIG. 2 showing a mono-pod inserted in the invention's central bore and secured from rotational or vertical displacement via a securing means. Turning now to FIG. 4.

In FIG. 4 greater specificity is provided with respect to mono-pod 15 insertion in mono-pod receptacle 10. FIG. 4 adjustment means 14 and 19 have been screwed or otherwise put in place to secure mono-pod's upward and rotational movement respectively. FIGS. 3 and 4 further illustrate one embodiment of the instant invention wherein storage pockets 6 are shown illustrated external of the apparatus storage compartment.

FIGS. 5 and 6 illustrates a readily envisioned alternative embodiment of the instant invention wherein storage pockets of the instant invention are located within the internal cavity of the instant invention. Turning now to FIGS. 5 and 6.

FIGS. 5 and 6 disclose a readily envisioned alternative embodiment of the instant invention wherein storage pockets 6 are shown positioned within the internal portion 5 of said storage compartment. As envisioned and practiced, the instant invention is capable of supporting any combination of external only, internal only, or internal and external positioning of storage compartments. FIG. 5 illustrates a side view of an alternative embodiment with internal storage compartments wherein FIG. 6 represents to the reader a frontal view illustration of the device of FIG. 5. As can be seen in FIGS. 1 through 6 the pockets 6 of the instant invention may take on a variety of dimensional characteristics to allow versatility and variability with respect to storage requirements. Each of said pockets however represent closable sections 6 and 8 which may be closed via zipper 7 or other non-permanent closing means, such as but not limited to zippers, snaps, Velcro, etc.

The claims and specifications describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While this invention has been described to illustrative embodiments, this description is not to be construed in a limiting sense. Various modifications and combinations of the illustrative embodiments as well as other embodiments will be apparent to those skilled in the art upon referencing this disclosure. It is therefore intended that this disclosure encompass any such modifications or embodiments.

What is claimed is:

1. An apparatus for supporting a camera in a stable position from an individual's torso comprising, a storage compartment which is defined by upper and lower walls, opposite side walls and front and rear walls, said rear wall further comprising a proximal attachment surface and a distal attachment surface; a waist band with first and second locking elements attached to said proximal attachment surface, a neck band attached to said proximal attachment surface, a mono-pod receptacle with a mono-pod receiving bore, at least one adjustable attachment means for fixedly positioning a mono-pod insertably received within a receiving aperture.

2. The apparatus of claim 1 wherein said adjustable attachment means is a screwing type adjustment means.

3. The apparatus of claim 1 further comprising at least one storage pocket and means for selectively opening and closing said pocket.

4. The apparatus of claim 1 further comprising at least one pocket located within the internal portion of the apparatus and one pocket located on one external surface of said apparatus.

5. The apparatus of claim 1 further comprising at least one pocket located within the internal portion of the apparatus.

6. The apparatus of claim 1 further comprising at least one pocket located on an external surface of said apparatus.

7. The apparatus of claim 1 further comprising at least one aperture through the upper wall of the apparatus to allow passage therethrough of a mono-pod.

8. The apparatus of claim 1 wherein said receiving bore is positioned at an angled orientation.

\* \* \* \* \*